United States Patent [19]
Lee

[11] Patent Number: 5,934,084
[45] Date of Patent: Aug. 10, 1999

[54] AIR CONDITIONER HAVING A METHOD AND APPARATUS FOR PERFORMING A DRY OPERATION TO REMOVE HUMIDITY DURING A COOLING MODE

[75] Inventor: Seung-Kwan Lee, Suwon, Rep. of Korea

[73] Assignee: Samsung Electronics Co., Ltd., Suwon-City, Rep. of Korea

[21] Appl. No.: 09/208,582

[22] Filed: Dec. 10, 1998

[30] Foreign Application Priority Data

Dec. 17, 1997 [KR] Rep. of Korea ............ 97-69430

[51] Int. Cl.⁶ ............................................. F25B 13/00
[52] U.S. Cl. ................... 62/93; 62/157; 62/173; 62/231; 62/161; 62/180; 62/186
[58] Field of Search ........................ 62/173, 93, 90, 62/157, 231, 176.1, 176.5, 176.6, 176.3, 160, 161, 186, 228.1, 180; 165/269

[56] References Cited

U.S. PATENT DOCUMENTS

| | | | |
|---|---|---|---|
| 4,841,738 | 6/1989 | Katsuki et al. | 62/160 |
| 5,231,845 | 8/1993 | Sumitani et al. | 62/160 |
| 5,305,822 | 4/1994 | Kogetsu et al. | 165/12 |
| 5,319,942 | 6/1994 | Paustian et al. | 62/89 |
| 5,345,776 | 9/1994 | Komazaki et al. | 62/176.3 |

*Primary Examiner*—Henry Bennett
*Assistant Examiner*—Marc Norman
*Attorney, Agent, or Firm*—Burns, Doane, Swecker & Mathis, L.L.P.

[57] ABSTRACT

A dry operation is performed during a room-cooling mode of an air conditioner by performing a pattern of heating, cooling, and blowing-only steps. The pattern of steps is controlled as a function of sensed room temperature to ensure that the room temperature is kept within a predetermined comfort range.

11 Claims, 12 Drawing Sheets

FIG.12

| STEP | 1 | 2 | 3 | 4 | 5 | 6 | 7 |
|---|---|---|---|---|---|---|---|
| COMPRESSOR ON-TIME (MINUTE) | 7 | 6 | 6 | 5 | 4 | 3 | 3 |
| COMPRESSOR OFF-TIME (MINUTE) | 3 | 3 | 4 | 5 | 6 | 6 | 7 |

(UNIT:MINUTE)

AIR CONDITIONER HAVING A METHOD AND APPARATUS FOR PERFORMING A DRY OPERATION TO REMOVE HUMIDITY DURING A COOLING MODE

BACKGROUND OF THE INVENTION

1. Field of the Invention

The present invention relates to an air conditioner for performing a cooling and a heating operation, and more particularly to a method and apparatus for performing a dry operation wherein the air conditioner switches between heating and cooling while a cooling mode to remove humidity from the room for establishing a pleasant environment therein.

2. Description of the prior art

Generally, an air conditioner can be classified into two types, one for heating and the other for cooling the room. There is an air conditioner for dual purpose of heating and cooling, and even an air conditioner having an air cleaning capability.

As illustrated in FIG. 1, an indoor unit of a cooling and heating apparatus for the cooling and heating functions is shown and this apparatus of course includes an outdoor unit (not shown).

Reference numeral 1 in FIG. 1 is a body (hereinafter referred to as indoor unit) having a lower air inlet 3 and an upper discharge outlet 5.

The discharge outlet 5 is provided at a right side thereof with a remotely controlled signal receiver 7 and is also provided with horizontal blades 11 and vertical blades 13.

Meanwhile, a remotely controlled unit 9 (hereinafter referred to as remocon) is mounted with a plurality of functional keys and timer keys.

FIG. 2 is a side view of the indoor unit installed at a wall.

The indoor unit 1 is provided with a bar-shaped indoor heat exchanger 15 and an indoor fan 17 is provided to circulate air.

Furthermore, the indoor unit 1 is provided with a duct member 19. An evaporated water dish 21 is provided to collect condensate.

In the inverter type air conditioner thus described, a four way valve 31 is activated (i.e., "on") during a heating mode to allow coolant to flow via a circulating loop which is formed by compressor 30 - four way valve 31 - indoor heat exchanger 15 - capillary vessel 50 - outdoor heat exchanger 40 - four way valve 31 - compressor 30. (see the dotted line arrows in FIG. 3)

Meanwhile, during the cooling mode, the four way valve 31 is rendered off to thereby allow the coolant to flow via a circulating loop which is formed by compressor 30 - four way valve 31 - outdoor heat exchanger 40 - capillary vessel 50 - indoor heat exchanger 15 - four way valve 31 - compressor 30. (see the solid line arrows of FIG. 3)

The four way valve 31 serves to control a passage so that the coolant can be circulated in solid line when the four way valve 31 is off, and when the four way valve 31 is on, the coolant is circulated in the direction of the dotted line arrows.

In the cooling and heating dual purpose air conditioner thus described when a user manipulates the remocon to press an operation/stop key (hereinafter referred to as operation key) and input a desired mode (by way of example, cooling) and established temperature Ts and an established air amount, a remote control signal corresponding to the key input is coded by a predetermined protocol and the signal thus coded is modulated and is transmitted in an ultra-red signal.

When the ultra-red signal is transmitted from the remocon 9 a remocon signal receiver 7 at the indoor unit 1 receives the same and transforms same to an electrical signal. The signal is then decoded to start operating the indoor unit 1, whereby an indoor fan 17 is rotated in response to the established air amount to draw the room air to be infused into the indoor unit 1 via the inlet 3.

When temperature of the room air is sensed by a temperature sensor (not shown), the indoor unit 1 compares the established temperature(Ts) and the room temperature(Tr) and if the room temperature(Tr) is higher than the established temperature(Ts), an operational frequency of the compressor 30 is determined by the difference between the room temperature(Tr) and the established temperature(Ts) to thereby drive the compressor 30.

When the compressor 30 is driven, a cooling cycle is formed along the solid arrow line according to the inactivated four way valve 31. When gaseous coolant of high temperature and high pressure discharged from the compressor 30 at the outdoor unit is conducted into the outdoor heat exchanger 40, the outdoor heat exchanger 40 serves to heat-exchange the gaseous compressed coolant which is thus condensed into liquefied coolant of low temperature and low pressure and conducted to the capillary vessel 50.

The liquefied coolant conducted to the capillary vessel 50 is expanded and becomes an easily evaporable coolant which is conducted to the indoor heat exchanger 15 disposed in the indoor unit 1. The coolant evaporates to cool the room air.

The cool air flow direction is controlled by the horizontal and vertical blades 11 and 13 disposed at the discharge outlet 5, and the gaseous coolant cooled by the indoor heat exchanger 15 is conducted back into the compressor 30 and changed into coolant gas to repeat the cooling cycle mentioned above.

Meanwhile, during the heating operation, the established temperature Ts and the indoor temperature (Tr) are compared and if the established temperature(Ts) is higher than the indoor temperature (Tr), the operational frequency is determined according to the difference between the established temperature (Ts) and the room temperature (Tr) to thereby drive the compressor.

When the compressor is driven, there is established a cooling cycle defined by the solid line illustrated in FIG. 3 according to the activation of the four way valve 31. When the gaseous coolant of high temperature and high pressure discharged from the compressor 30 is conducted into the indoor heat exchanger 15, the indoor heat exchanger 15 serves to heat exchange the air and cool the coolant which becomes a room temperature and high pressure liquid. Warm air can be discharged to the room via the discharge outlet 5 to thereby perform the heating operation.

The liquefied coolant is evaporated through the capillary vessel 50 and reduced in temperature and pressure before being conducted into the outdoor heat exchanger 40. The coolant in the outdoor heat exchanger 40 is heat-exchanged by the air blown by the outdoor fan 41 to be cooled and infused into the compressor 30, wherein the coolant is transferred to gaseous coolant.

In the air conditioner performing the cooling and heating operations according to the coolant cycle, it executes the cooling and humidifying operations until an established temperature is reached, and when the established temperature is reached, as illustrated in FIG. 4, a dry operation is performed wherein the indoor fan 17, outdoor fan 41, four way valve 31 and the compressor 30 automatically perform a predetermined pattern of heating H, cooling C, and blowing-only B (i.e., blowing air without the compressor being on) in one cycle (53 minutes).

However, there is a problem in the conventional dehumidifying operation in that room temperature is over-heated or over-cooled according to the size of the load in the internal space as illustrated in FIG. 4, so that pleasantness degree expressed in Predicted Percentage of Dissatisfied (PPD) felt by the user becomes very high to thereby give the user unpleasantness.

DETAILED DESCRIPTION OF THE INVENTION

The present invention is disclosed to solve the above mentioned problems and it is an object of the present invention to provide a dry operation apparatus of air conditioner and method thereof by which over-cooling of the room is prevented and when the room is over-cooled, a heating function is added so that temperature in the room is raised to maintain a predetermined temperature (23–25 degrees Celsius) to thereby improve dehumidifying efficiency for pleasantness in the room.

One aspect of the present invention relates to a method of operating an air conditioner, the air conditioner including an air inlet and air outlet, an outdoor heat exchanger, an indoor heat exchanger disposed in an air flow path from the inlet to the outlet, a compressor for compressing refrigerant conducted between the indoor and outdoor heat exchangers, an adjustable valve for controlling a direction of flow of refrigerant to switch between heating and cooling modes, a variable speed fan for circulating air from the inlet to the outlet, the fan being operable in a blowing-only mode wherein the fan operates with the compressor off, air directing blades extending across the outlet for regulating a direction in which the air is discharged, a motor-driven adjuster the orientation of the blades to vary the air discharge direction, an inputting mechanism for inputting a selected operating mode and an established room temperature, and a temperature sensor for sensing room temperature, the method comprising the steps of:

(A1) determining whether a dry operation is selected;
(A2) operating the air conditioner in a predetermined cycle if the dry operation is selected, the cycle including:
  (A21) operating the air conditioner in a cooling mode until an established temperature is reached,
  (A22) performing a heating operation for a preset time period if the sensed temperature is below a predetermined comfort temperature which is higher than the established temperature, and
  (A23) performing a cooling operation to return the temperature to the established temperature;
(A3) determining, subsequent to the step (A23), an execution time period in which the cycle was performed;
(A4) increasing a speed of the fan if the execution time period determined in step (A3) exceeded a reference time period; and
(A5) operating the adjuster to change an orientation of the blades if the execution time period determined in the step (A3) exceeded a reference time period.

BRIEF DESCRIPTION OF THE DRAWINGS

FIG. 12 is a schematic diagram for illustrating a time pattern table of an air conditioner according to the present invention.

DETAILED DESCRIPTION OF THE INVENTION

Hereinafter, an embodiment of the present invention will be described in detail with reference to the accompanying drawings.

Figure 1:
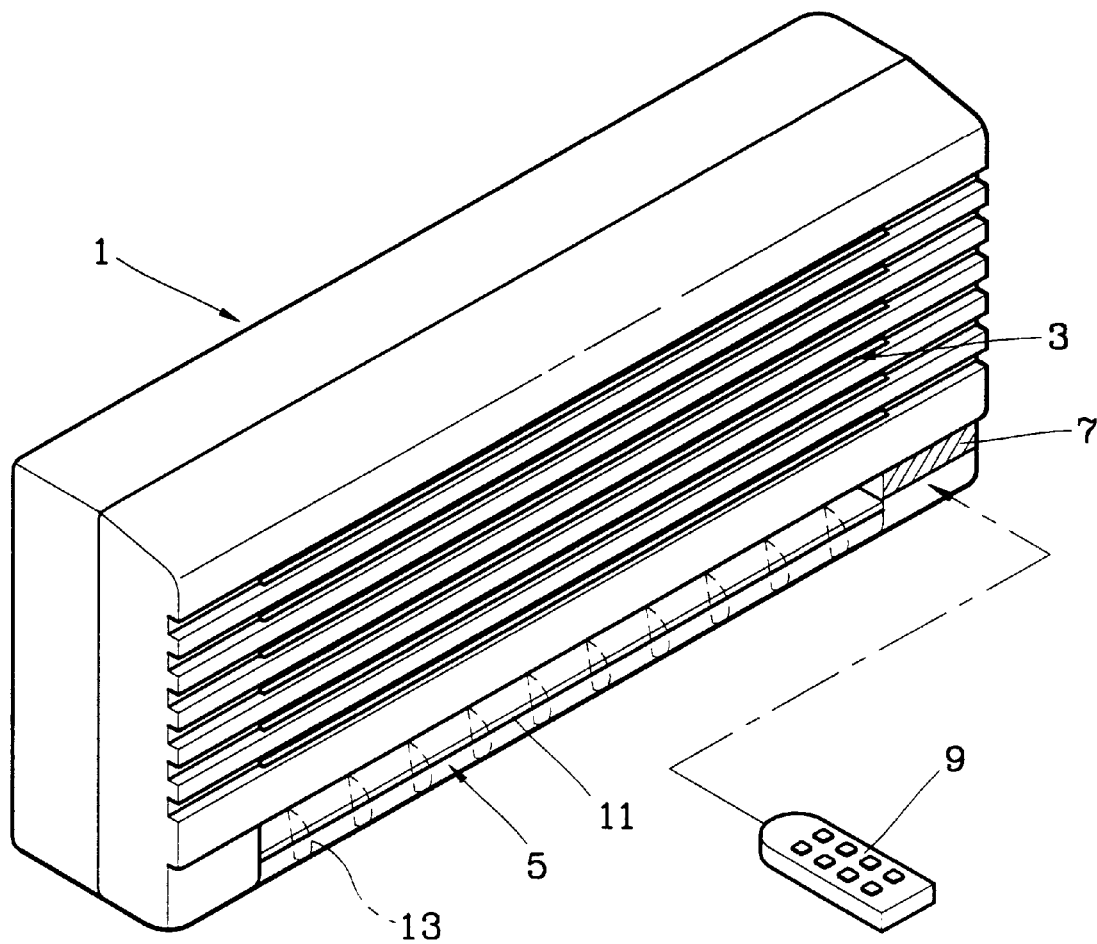
FIG. 1 is a perspective view for illustrating an indoor unit of a conventional air conditioner.
Figure 2:
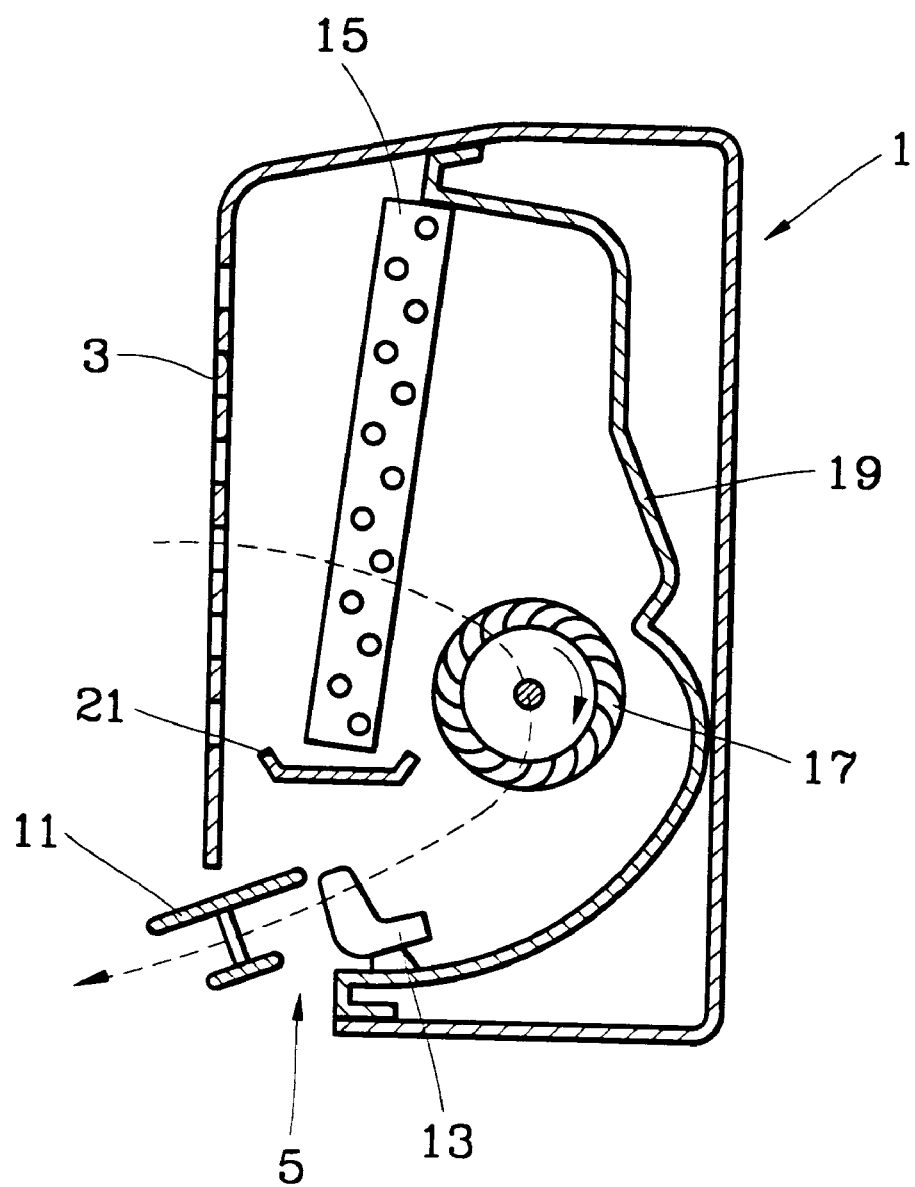
FIG. 2 is a side sectional view for illustrating an indoor unit disposed on the wall in FIG. 1.
Figure 3:
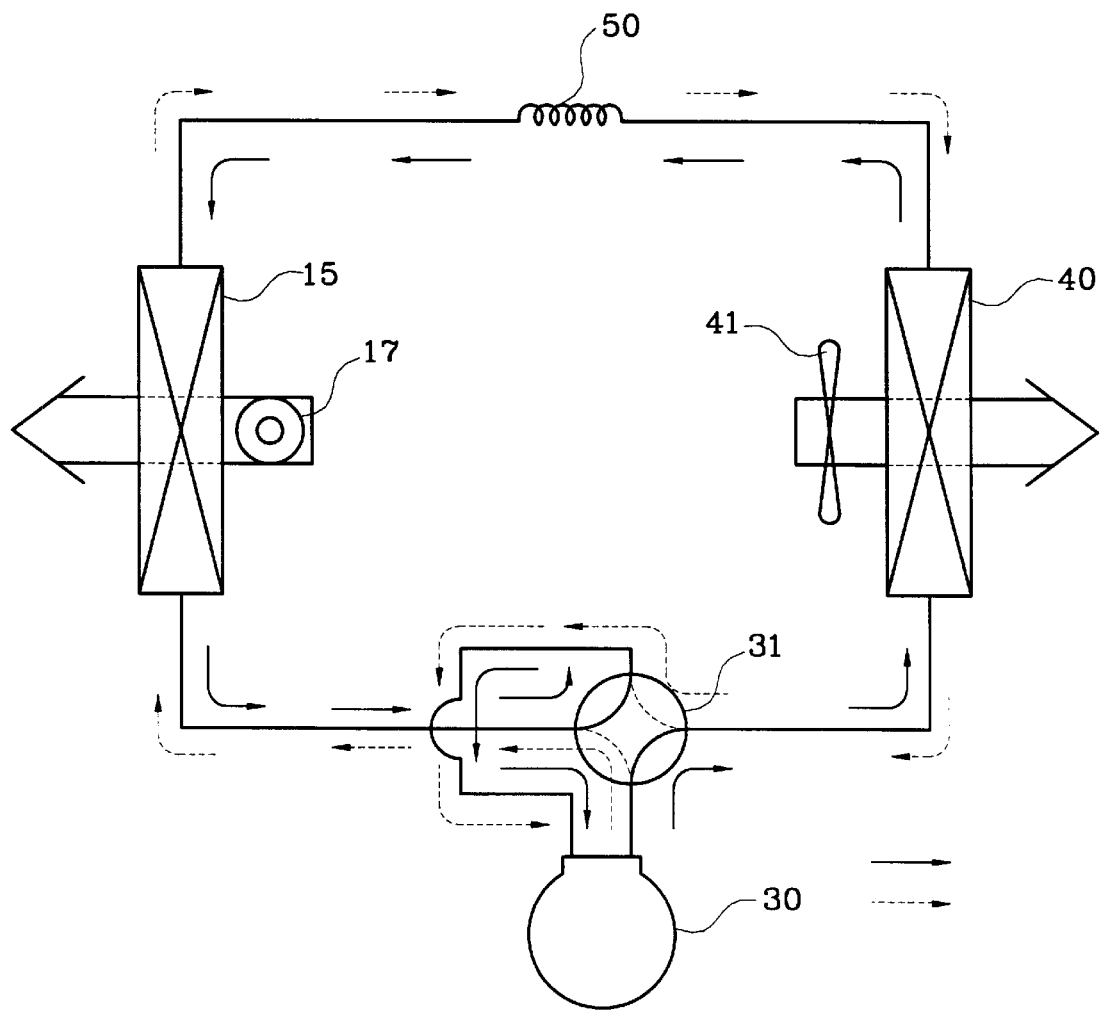
FIG. 3 is a schematic diagram for illustrating a coolant cycle of a conventional air conditioner.
Figure 4:
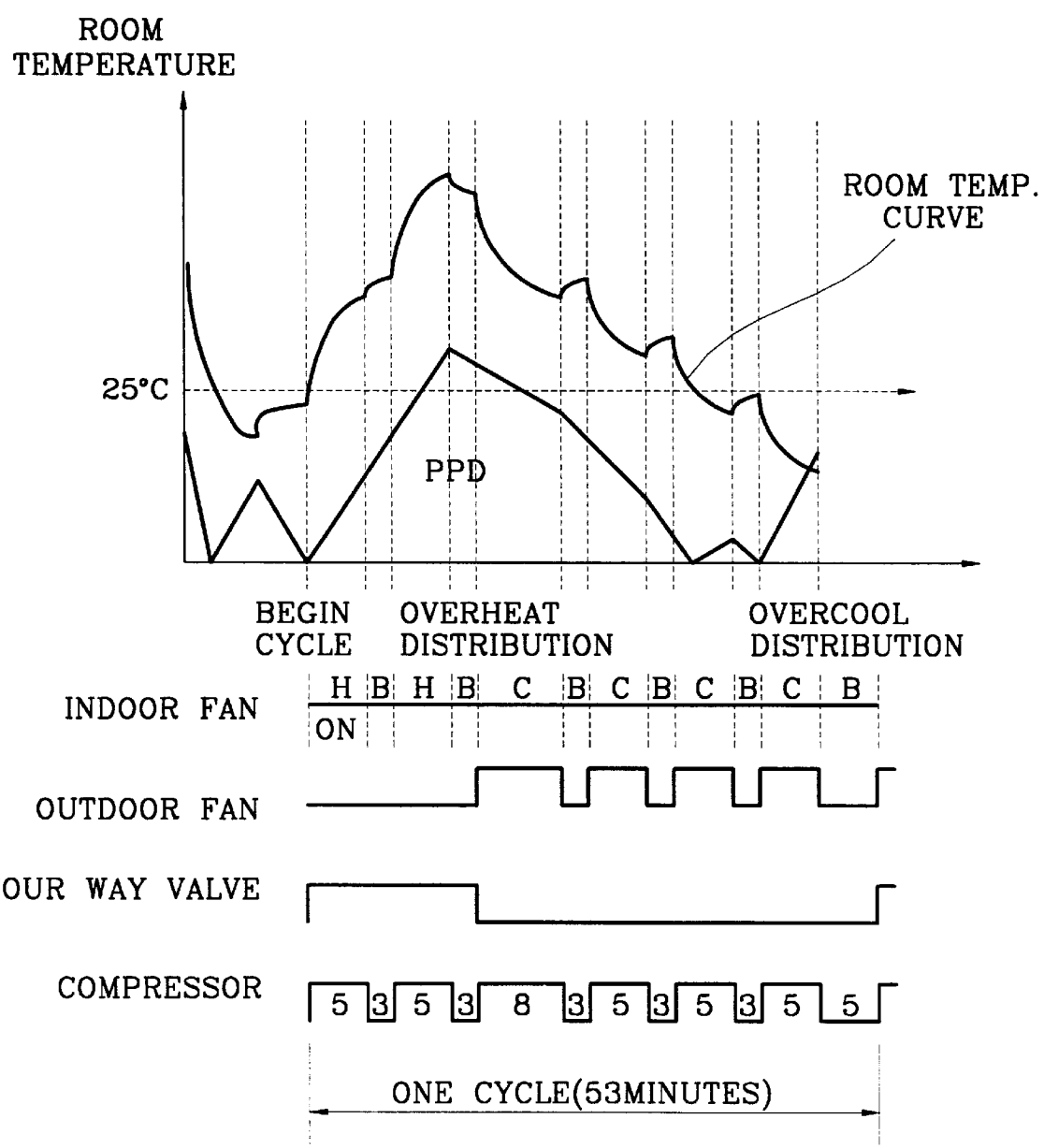
FIG. 4 is a graphic for illustrating a dry operation pattern domain of an air conditioner according to the prior art.

Throughout the drawings, like reference numerals and symbols are used for designation of like or equivalent parts or portions as in FIGS. 1, 2 and 3 for simplicity of illustration and explanation, so that redundancy will be omitted.

Figure 5:
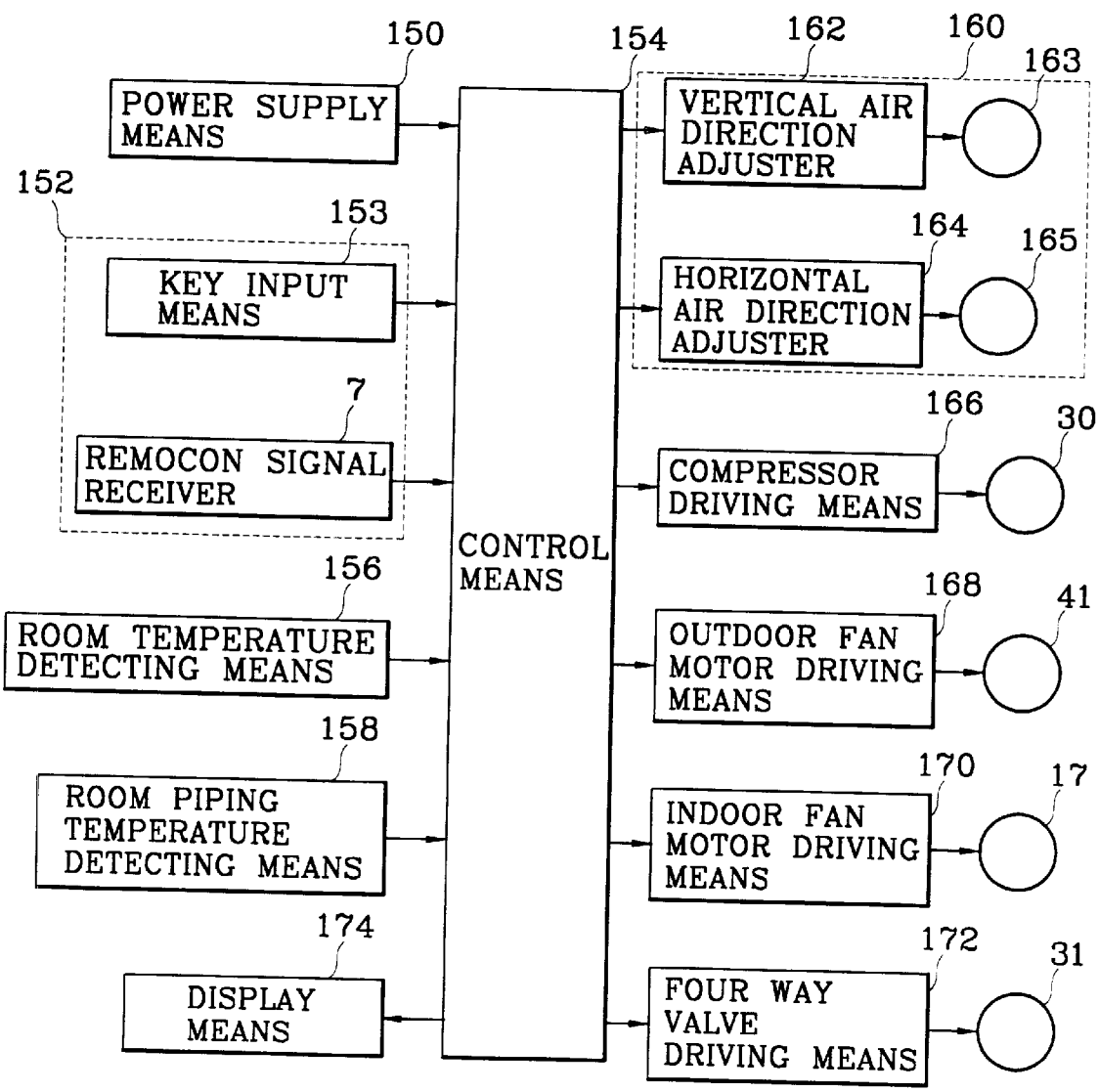
FIG. 5 is a control block diagram for illustrating a dry operation of an air conditioner according to an embodiment of the present invention.

As illustrated in FIG. 5, power means 150 serves to convert a commercial alternating current AC voltage supplied from an AC power supply terminal (not shown) to a predetermined direct current DC voltage necessary for operation of the air conditioner and output same. An operation manipulating means 152 is equipped with a plurality of functional keys for inputting operational modes (automatic, cooling, dry, blowing, heating and the like), established air amount, established air direction, established temperature (Ts) and operation/stop of the air conditioner, and is disposed with a key input unit 153 mounted at a control panel of the indoor unit 1 and a remocon signal receiver 7 for receiving an ultra-red signal transmitted from the remocon 9 according to the key manipulation of the remocon 9.

Furthermore, control means 154 is a microcomputer which receives the DC voltage output from the power supply means 150 to initialize the air conditioner and controls the whole operations of the air conditioner according to the operation selection signal input by the operation manipulation means 152.

The control means controls the on/off time of the compressor 30 by time and variable air direction control for completing one cycle within a predetermined time during the dry operation and increases the cooling capability by the air amount control of the indoor fan according to the room temperature.

Room temperature detecting means 156 serves to detect the temperature of the room air sucked into the indoor unit 10 for comparison with the established temperature (Ts).

Coolant temperature detecting means 158 detects the temperature of the coolant which passes through the indoor heat exchanger 15, that is, piping temperature of the indoor heat exchanger 15 which changes during the dry operation of the air conditioner, to output same to the control means 154.

Furthermore, air direction control means 160 serves to vertically and horizontally control the direction of the air discharged through the discharge outlet 5 and includes horizontal blades air adjuster 162 for driving a stepping motor 163 to cause the horizontal blades 11 to rotate up and down, and a vertical blades air adjuster 164 for driving a stepping motor 165 to cause the vertical blades 13 to rotate to the left and right.

Compressor driving means 166 receives a control signal from the control means 154 according to difference between the room temperature (Tr) and the established temperature (Ts) to controllably drive the compressor 30.

Outdoor fan motor driving means 168 receives the control signal output from the control means 154 according to the difference between the room temperature (Tr) and the established temperature (Ts) to control the speed of the outdoor fan motor to controllably drive the outdoor fan 41.

Furthermore, indoor fan motor driving means 170 controllably drives the indoor fan 17, and four way valve driving means 172 controllably drives the four way valve 31, so that it can be turned on and turned off. The display means 174 displays the operation selection modes and the operation status.

Now, operational effects of the dry operation apparatus of the air conditioner according to the present invention thus constructed will be explained in detail.

Figure 6:
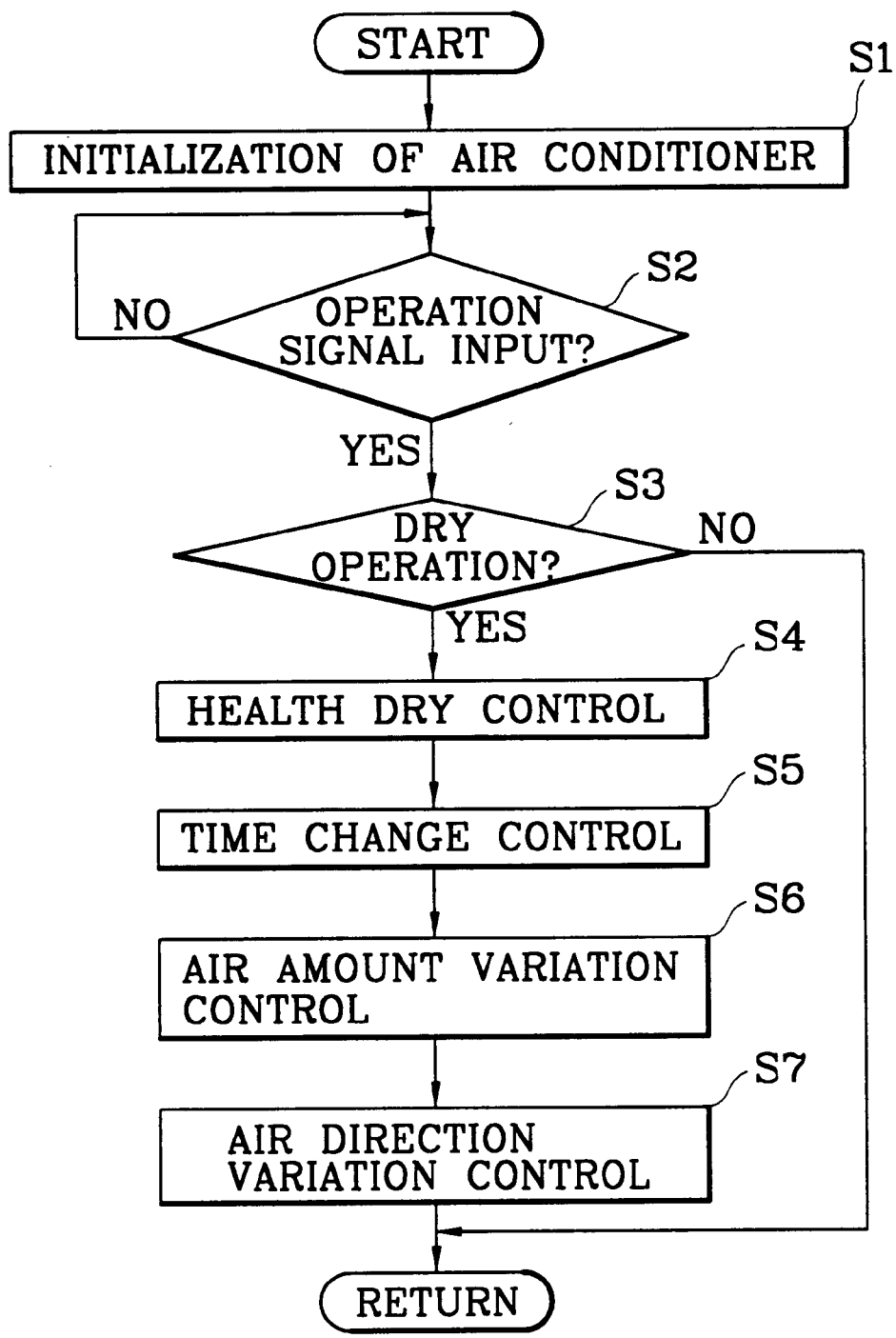
FIG. 6 is a flow chart for illustrating a dry operation procedure of an air conditioner according to the present invention.

FIG. 6 is a flow chart for describing operational procedures of the dry operation of an air conditioner according to the present invention, where S defines steps.

First of all, when the power is supplied to the air conditioner, the power supply means 150 outputs a predetermined DC voltage to each driving circuit and the control means 154.

Accordingly, at step S1, the control means 154 receives the DC voltage to initialize the air conditioner. At this time, when the user inputs the operational modes, established temperature Ts (e.g., 23° C. or 24° C.) and established air direction, a remote control signal corresponding to the key input is coded by a predetermined protocol at the remocon 9 and the coded signal is modulated to transmit an ultra-red signal.

When the ultra-red signal is transmitted, a remocon signal receiver 7 receives said signal to convert same to an electric signal, and the converted signal is demodulated so that operational selection signal and operation start signal are input to the control means 154.

Successively, at step S2, the control means 154 determines whether the operational signal has been input from the operational manipulation means 152 and when the signal is not input (in case of NO), the control means 152 maintains the air conditioner at standby condition and repeats operations subsequent to step S2.

As a result of the determination at step S2, if the operation signal is input, flow advances to step S3, where the control means 154 determines whether the operation signal is for health dry operation (hereinafter referred to as dry operation), if it is not for the dry operation (in case of NO), the flow returns.

As a result of the determination at step S3, if the operation is for dry operation, flow proceeds to step S4, where the control means 154 controls the dry operation for controlling the room temperature to obtain a pleasant atmosphere having temperature, i.e., ranges of 23–25° C. if 23° C. is the established temperature, and 24–26° C. if 24° C. is the established temperature.

Figure 7:
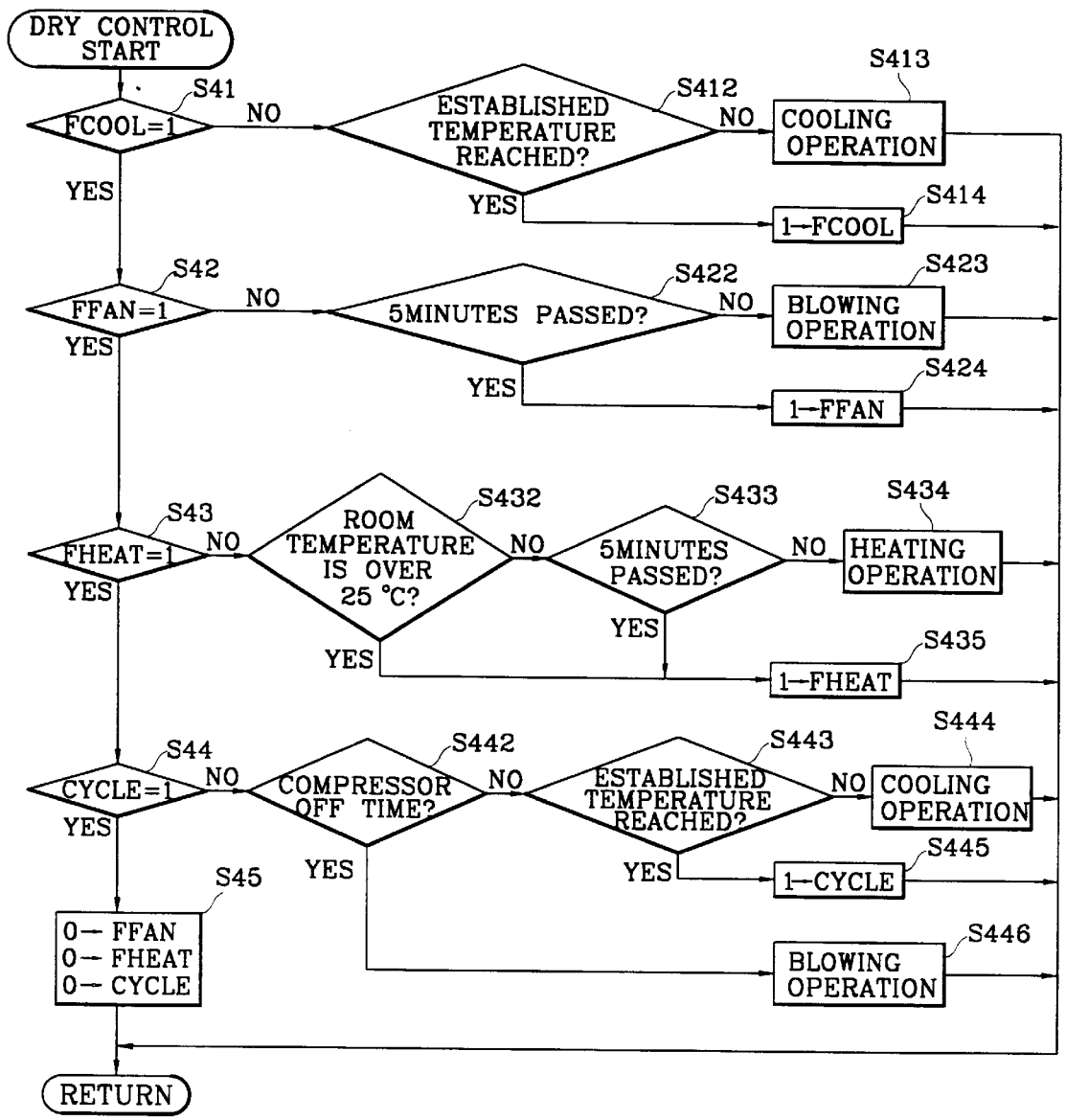
FIG. 7 is a flow chart for illustrating a dry operation procedure of an air conditioner according to the present invention.

FIG. 7 is a flow chart for illustrating dry operation of the air conditioner performed during a cooling mode, according to the present invention.

As an initial condition for explaining the operation of the present invention, FCOOL, FFAN, FHEAT, CYCLE initial values are given as zero (0). When the air conditioner enters the dry operation, at step S41, the control means 154 determines whether the FCOOL value is 1 and if the value is not 1 (in case of NO), flow advances to step S412 and checks whether the room temperature (Tr) has reached the established temperature (Ts).

Figure 11:
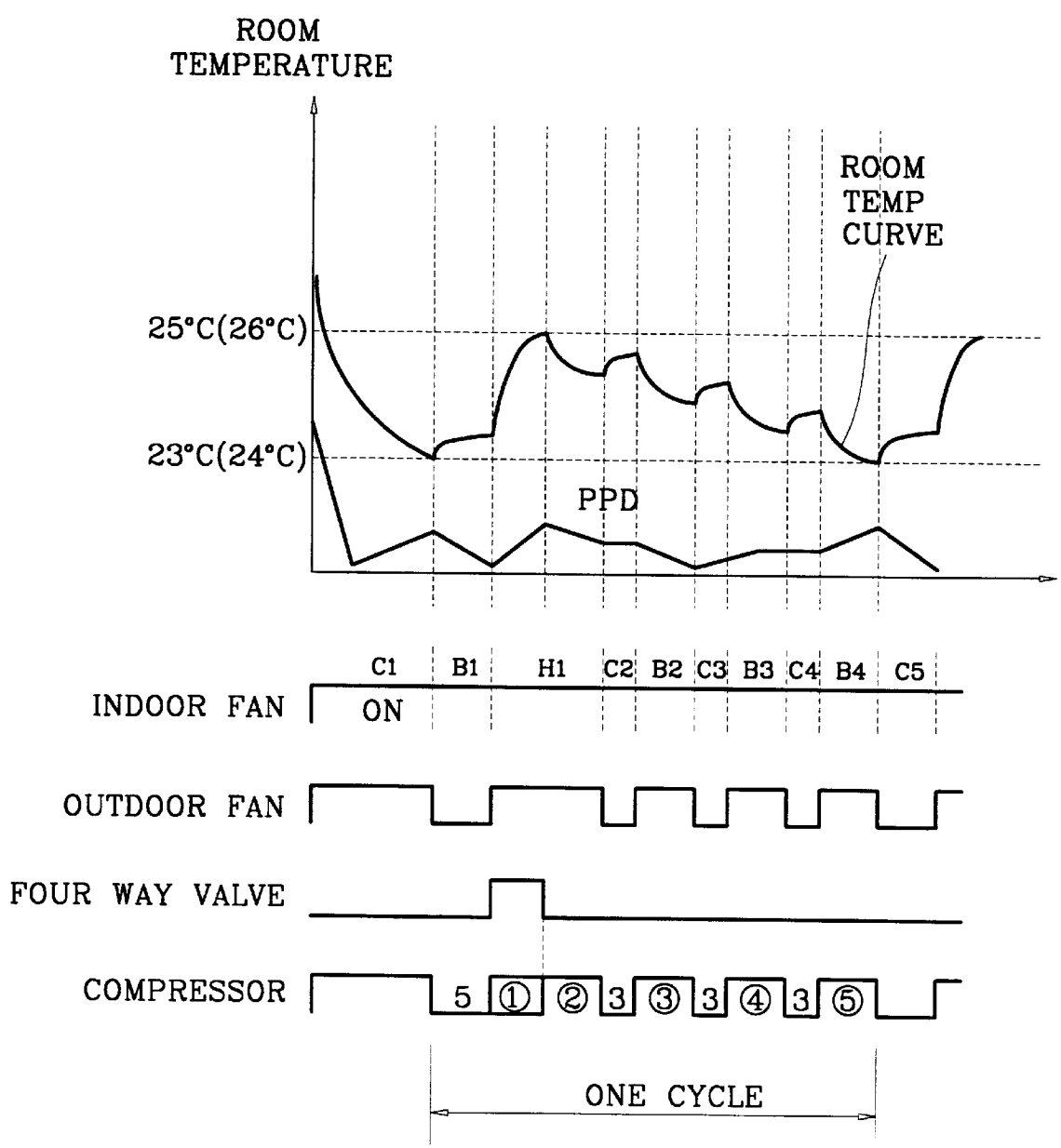
FIG. 11 is a schematic diagram for illustrating a dry operation pattern domain of an air conditioner according to the present invention.

As a result of the determination at step S412, if the room temperature (Tr) has not reached the established temperature (Ts) (in case of NO), flow proceeds to step S 413, where the control means 154 controls compressor driving means 166, outdoor fan motor driving means 168, four way valve driving means 172, and indoor fan motor driving means 170, as illustrated in FIG. 11 to turn on the compressor 30 and the outdoor fan 41 and to turn off the four way valve 31. The control means 154 now performs a cooling operation to turn on the indoor fan 17 at ultra-low speed, which is lower than the operating speed. (see phase CI in FIG. 11). When the room temperature reaches the established temperature (in case of YES), flow proceeds to step S414 and returns to establish the FCOOL value at 1.

As a result of the determination at step 41, if FCOOL value is 1 (in case of YES), flow advances to step S42, where the control means 154 determines whether FFAN value is 1, and if the value is not 1 (in case of NO), flow proceeds to step S422, where a blowing-only (compressor-off) operation is performed for five minutes. That is, the control means 154 begins to count the time and determines whether the counted time exceeds a predetermined time (approximately 5 minutes).

As a result of the determination at step S422, if the time has not passed the predetermined time (in case of NO), flow advances to step S423, where the control means 154 controls the compressor driving means 166, outdoor fan motor driving means 168, four way valve driving means 172 to turn off the compressor 172, outdoor fan 41 and the four way valve 31, as illustrated at phase B1 in FIG. 11, and performs a blowing only and dehumidifying operation by turning on the indoor fan 17 at ultra low speed. Dehumidifying occurs because the heat exchanger coils are still cool enough to cause moisture to condense thereon.

If the predetermined time of 5 minutes has passed (in case of YES), which means that the blowing-only operation B1 has been completed, flow advances to step S424, to establish the FFAN value at 1 and returns.

As a result of the determination at step S42, if the FFAN value is 1 (in case of YES), flow proceeds to step S43, where the control means 154 determines whether the FHEAT value is 1. If the value is not 1 (in case of NO), flow proceeds to step S432 to determine whether the room temperature is above 25 degrees Celsius.

As a result of the determination at step S 432, if the room temperature is not above 25 degrees Celsius (in case of NO), flow advances to step S 433, where the control means 154 performs a five-minute heating operation. That is, the control means 154 begins to count time and determines whether the counted time exceeds a predetermined time (approximately 5 minutes). If the predetermined time has not passed (in case of NO), flow proceeds to step S 434, where the control means 154 controls the compressor driving means 166, outdoor fan motor driving means 168, four way valve driving means 172 and the indoor fan motor driving means 170, and as illustrated at phase H1 in FIG. 11, turns on the compressor 30, outdoor fan 41 and the four way valve 31.

The control means 154 performs the heating operation for turning on the indoor fan 17 at ultra low speed and returns. Dehumidifying occurs because the room temperature is being increased. If the room temperature 25 degrees Celsius while the blowing-only operation B1 is performed in step S423, the heating of step S434, which is defined as domain 1 of the compressor in FIG. 11, is disregarded, i.e., is not performed.

As a result of the determination at step S 433, if the predetermined time of approximately 5 minutes has passed (in case of YES), this means that the initial heating phase H1 has been completed. On the other hand as a result of the determination at step S432, if the room temperature is above 25 degrees Celsius (in case of YES), flow advances to step S435 because there is no need for executing the heating phase H1 and establishes FHEAT value at 1 and returns.

As a result of the determination at step S43, if the FHEAT value is 1 (in case of YES), flow advances to step S44 and determines whether CYCLE is 1 and if the value of CYCLE is 1 (in case of YES), flow proceeds to step S45, where the control means 154 establishes the values of FFAN, FHEAT and CYCLE at 0 (zero) and returns.

As a result of the determination at step S44, if the value of CYCLE is not 1 (in case of NO), flow proceeds to step S442 to determine whether the compressor 30 is turned off. If the compressor 30 is off (in case of YES), flow advances to step S446, where the control means 154 controls the compressor driving means 166, outdoor fan motor driving means 168, four way valve driving means 172 and the indoor fan motor driving means 170 and, as illustrated in FIG. 11, turns off the compressor 30, outdoor fan 41 and the four way valve 31. The control means 154 then turns on the indoor fan 17 to perform a blowing-only phase B2 at low fan speed which is lower than a normal fan speed.

As a result of the determination at step S442, if the compressor 30 is turned off (in case of NO), flow advances to step S443 to determine whether the room temperature is at the established temperature and if the room temperature is not at the established temperature (in case of NO), flow proceeds to step S 444, where the control means 154 controls the compressor driving means 166, outdoor fan motor driving means 168, four way valve driving means 172 and the indoor fan motor driving means 170 and as illustrated in FIG. 11, turns on the compressor 30 and the outdoor fan 41 and turns off the four way valve 31. The control means 154 then performs a cooling dehumidifying phase C2 by turning on the indoor fan 17 at low fan speed and returns.

As a result of the determination at step S 443, if the room temperature has reached the established temperature (in case of YES), which means that one cycle for the room temperature to reach the established temperature (at this time, one cycle is variable) has been completed, so that flow proceeds to step S 445 to establish the value of the CYCLE at 1 and returns. After the compressor on-period has expired, if the room temperature has reached the established temperature, then blowing only operations B2, B3, B4, etc. are performed in alternating relationship with cooling operations C2, C4, C5, etc. until the established temperature is reached. The compressor "on" and "off" periods are preset in the controller for those cooling and blowing-only operations C2 through C5 and B2 through B4. Those on-off periods correspond to one of the "steps" 1–7 shown in FIG. 12 and are variable from a minimum of 1 minute to a maximum of 5 minutes according to the room temperature and when the established temperature is reached, a cycle is terminated.

Figure 8:
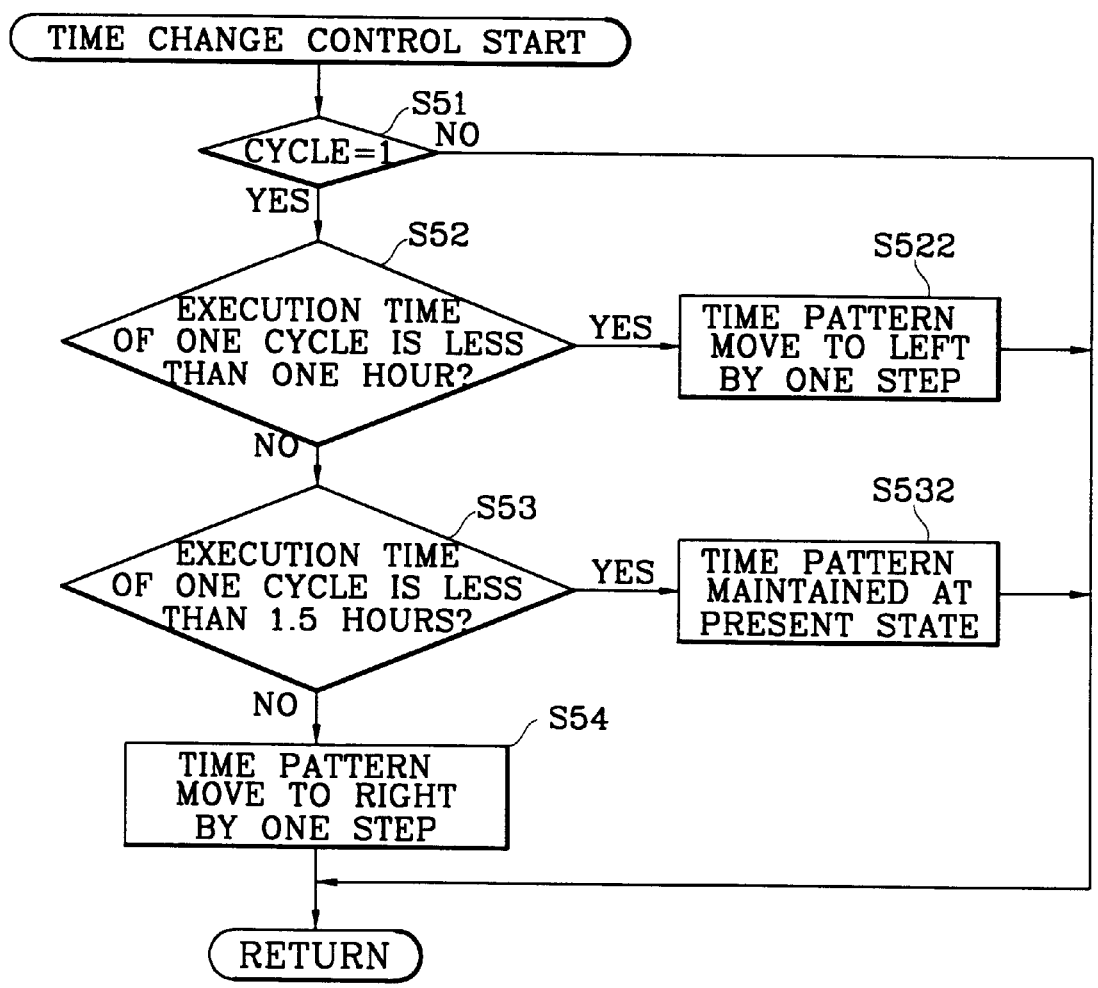
FIG. 8 is a flow chart for illustrating a time change control operation procedure of an air conditioner according to the present invention.

As mentioned above, when a cycle is completed, flow proceeds to step S 5 as illustrated in FIG. 6, where the control means 154 controls a time variation to cause future cycles to be completed within a predetermined time, as described in detail in FIG. 8.

FIG. 8 is a flow chart for illustrating an operational procedures of time change control in an air conditioner according to the present invention. As an initial condition for illustrating the operations of the present invention, an initial value of time pattern comprises 4 steps.

When one cycle of a dry operation air is completed, the control means 154 determines at step S51 whether value of one cycle is 1 and if the value is not 1 (in case of NOT), flow returns. As a result of the determination at step S51, if the value of the CYCLE is 1 (in case of YES), flow proceeds to step S52, where the control means 154 determines whether execution time of one cycle is less than one hour and if the execution time is less than 1 hour (in case of YES), flow advances to step S522, where the control means 154 moves the time pattern by one step from the present pattern to the left as illustrated in FIG. 12 to change the on/off time of the compressor 30 by increasing the ratio of "on" time to "off" time, and returns.

As a result of the determination at step S52, if the execution time of one cycle is not less than 1 hour (in case of NO), flow proceeds to step S53, where the control means 154 determined whether the execution time was less than 1 hour and 30 minutes and if the time was less than 1 hour and 30 minutes (in case of NO), flow advances to step S54, where the control means 154 moves the time pattern to the right by one step as illustrated in FIG. 12 to change the on/off time of the compressor 30 by decreasing the ratio of "on" time to "off" time.

As a result of the determination at step S53, if the execution time of one cycle is less than one hour and 30 minutes (in case of YES), flow proceeds to step S532, where the control means 154 maintains the time pattern at the present pattern state and returns.

Figure 9:
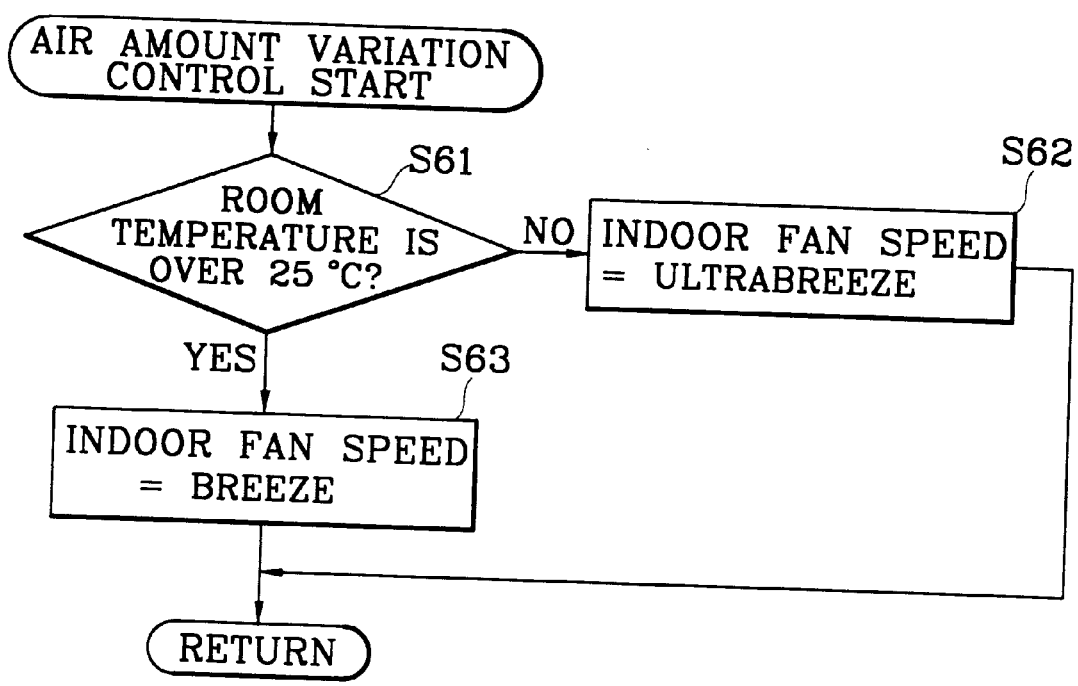
FIG. 9 is a flow chart for illustrating an operation procedure of air amount variation control according to the present invention.

As mentioned above, when one cycle is completed, flow proceeds to step S6, where the control means 154 controls the air amount by increasing the speed of the indoor fan 17 when the room temperature is higher than a predetermined pleasant temperature (approximately 25 degrees Celsius ), which is described in detail in FIG. 9.

FIG. 9 is a flow chart for illustrating operational procedures of air amount change control of an air conditioner according to the present invention.

When one cycle is completed within the predetermined time, the control means 154 determines at step S61 whether room temperature is above the predetermined pleasant temperature (approximately 25 degrees Celsius), and if the room temperature is not above 25 degrees Celsius (in case of NO), flow advances to step S62, where the control means 154 controls the indoor fan motor driving means 170 to drive the indoor fan 17 at ultra-breeze speed and returns.

As a result of the determination at step S61, if the room temperature is above 25 degrees Celsius (in case of YES), flow proceeds to step S63, where the control means 154 controls the indoor fan motor driving means 170 to drive the indoor fan 17 at breeze speed by increasing the speed of the indoor fan 17 so that cooling capability can be increased. Then flow returns.

Figure 10:
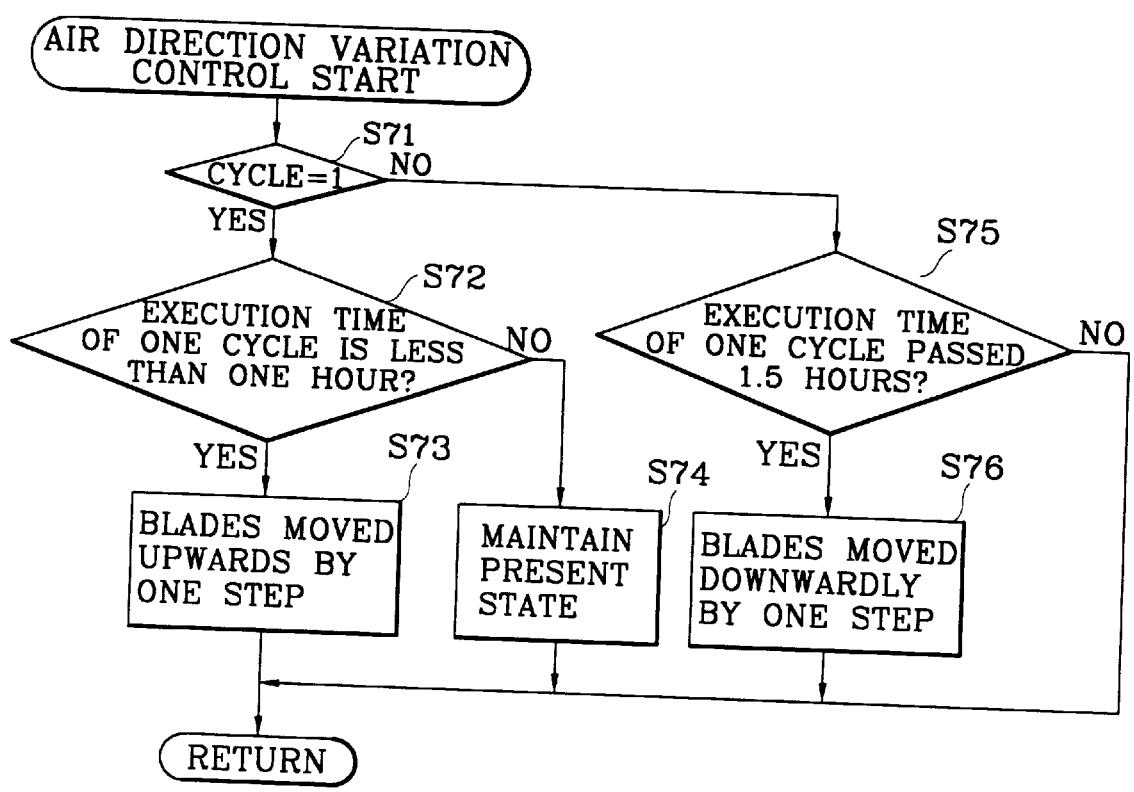
FIG. 10 is a flow chart for illustrating an operation procedure of air amount variation control according to the present invention.

If the one cycle execution time exceeded the predetermined time, flow advances to step 7 in FIG. 6, where the control means 154 controls the air amount variation, which is described in detail in FIG. 10.

FIG. 10 is a flow chart for illustrating operational procedures of air amount variation of the air conditioner according to the present invention.

There are cases when the temperature detected by the control means 154 and an average value of the room temperature differ beyond a predetermined value when horizontal blades 11 are situated at an uppermost position. Thus, in order to reduce the temperature difference, the position of the blades 11 are adjusted. At first, at step S71, the control means 154 determines whether the value of CYCLE is 1 and if the value is 1 (in case of YES), flow advances to step S72 to determine whether the execution time of one cycle is less than one hour.

As a result of the determine at step S72, if the execution time is less than 1 hour (in case of YES), flow proceeds to step S73, where the control means 154 controls the horizontal blades 11 to upwardly adjusted by one step from the present state and returns. If the time is not less than 1 hour (in case of NO), flow proceeds to step S74, where the control means 154 maintains the blades 11 in the position.

Meanwhile, as a result of the determination at step S74, if the value of CYCLE is not 1 (in case of NO), flow proceeds to step S75 to determine whether execution time of one CYCLE has exceeded 1 hour and 30 minutes and if the time has not exceeded 1 hour and 30 minutes (in case of NO), flow returns. If the time has passed (in case of YES), flow proceeds to step S76, where the control means 154 adjusts the horizontal blades 11 downwardly by one step from the present state and returns.

As mentioned above, PPD index (unsatisfactory index) is shown to be low (i.e., is acceptable) as illustrated in FIG. 11 because cooling and heating are performed according to the change of the room temperature, and the room temperature is maintained in a pleasant predetermined range of temperatures (23–25 degrees Celsius and 24–26 degrees Celsius) to thereby create a good feeling for a user.

As apparent from the foregoing, there is an advantage in the dry operation apparatus of an air conditioner and control method thereof in that room temperature is prevented from being overcooled in the time in which one cycle is completed during the dry operation. The end speed air direction can be automatically varied, and even if overcooling occurs, a heating function is additionally supplemented to thereby increase the room temperature to a predetermined temperature for maintenance of the room temperature at a predetermined temperature (23–25 degrees Celsius). Thus, the dehumidifying efficiency can be improved to avoid the overcooling of the room temperature which can occur during the existing cooling or dehumidifying operation and to prevent illness resulting from the overcooling, cold and the like, can be prevented and user is provided with a pleasant feeling.

What is claimed is:

1. A method of dry operating an air conditioner, the air conditioner including an air inlet and air outlet, an outdoor heat exchanger, an indoor heat exchanger disposed in an air flow path from the inlet to the outlet, a compressor for compressing refrigerant conducted between the indoor and outdoor heat exchangers, an adjustable valve for controlling a direction of flow of refrigerant to switch between heating and cooling modes, a variable speed fan for circulating air from the inlet to the outlet, the fan being operable in a blowing-only mode wherein the fan operates with the compressor off, air directing blades extending across the outlet for regulating a direction in which the air is discharged, a motor-driven adjuster the orientation of the blades to vary the air discharge direction, an inputting mechanism for inputting a selected operating mode and an established room temperature, and a temperature sensor for sensing room temperature, the method comprising the steps of:

(A1) determining whether a dry operation is selected;

(A2) operating the air conditioner in a predetermined cycle if the dry operation is selected, the cycle including:

(A21) operating the air conditioner in a cooling mode until an established temperature is reached, (A22) performing a heating operation for a preset time period if the sensed temperature is below a predetermined comfort temperature which is higher than the established temperature, and (A23) performing a cooling operation to return the temperature to the established temperature;

(A3) determining, subsequent to the step (A23), an execution time period in which the cycle was performed;

(A4) increasing a speed of the fan if the execution time period determined in step (A3) exceeded a reference time period; and (A5) operating the adjuster to change an orientation of the blades if the execution time period determined in the step (A3) exceeded a reference time period.

2. The method according to claim 1, wherein step (A2) further comprises operating the fan in a blowing-only mode with the compressor off for a predetermined time period between step (A21) and step (A22).

3. The method according to claim 1, wherein step (A2) further comprises performing, between steps (A22, A23), a plurality of intermediate cooling operations alternating with a plurality of blowing-only modes, the compressor being "on" during the intermediate cooling operations and being "off" during the blowing-only modes, the "on" time periods being equal and the "off" time periods being equal.

4. The method according to claim 3 further including the step of changing the ratio of the compressor "on" time period to the compressor "off" time period in response to comparing the execution time period with a reference time period.

5. The method according to claim 4 wherein the ratio is increased if the execution time period is less than one hour.

6. The method according to claim 4 wherein the ratio is unchanged if the execution time period is more than one hour and less than one hour and thirty minutes.

7. The method according to claim 4 wherein the ratio is decreased if the execution time period exceeds one hour and thirty minutes.

8. The method according to claim 1 wherein the blades are horizontal and are arranged to pivot up and down, step (A6) comprising pivoting the blades up if the execution time was less than one hour.

9. The method according to claim 1 wherein the orientation of the blades is unchanged if the execution time period was more than one hour and less than one hour and thirty minutes.

10. The method according to claim 8 wherein step (A6) comprises pivoting the blades downwardly if the execution time period was more than one hour and thirty minutes.

11. A dry operating apparatus of An air conditioner comprising an air inlet and an air outlet, an outdoor heat exchanger, an indoor heat exchanger disposed in an air flow path from the inlet to the outlet, a compressor for compressing refrigerant conducted between the indoor and outdoor heat exchangers, an adjustable valve for controlling a direction of flow of refrigerant to switch between heating and cooling operations, a variable speed fan for circulating air from the inlet to the outlet, the fan being operable in a blowing-only mode operation wherein the fan operates with the compressor off, air directing blades extending across the outlet for regulating a direction in which the air is discharged, a motor-driven adjuster for adjusting the orientation of the blades to vary the air discharge direction, and an inputting mechanism for inputting a selected operating mode and an established room temperature, a temperature sensor for sensing room temperature, and the control means for:

determining whether a dry operation is selected;

operating the air conditioner in a predetermined cycle if the dry operation is selected by:

operating the air conditioner in a cooling mode until an established signal is reached, performing a heating operation for a preset time period if the sensed temperature is below a predetermined comfort temperature which is higher than the established temperature, and performing a cooling operation to return the temperature to the established temperature;

determining an execution time period in which the cycle was performed;

increasing a speed of the fan if the execution time period exceeded a reference time period; and operating the adjuster to change an orientation of the blades if the execution time period exceeded a reference time period.

\* \* \* \* \*